US008651782B2

(12) United States Patent
Van Roosmalen et al.

(10) Patent No.: US 8,651,782 B2
(45) Date of Patent: Feb. 18, 2014

(54) WHEELED MOBILITY DEVICE CONTAINMENT SYSTEMS AND OCCUPANT RETENTION SYSTEMS AND METHODS OF CONTAINING WHEELED MOBILITY DEVICES AND RETAINING OCCUPANTS THEREOF

(75) Inventors: Linda Van Roosmalen, Verona, PA (US); Michael Turkovich, Pittsburgh, PA (US)

(73) Assignee: University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 371 days.

(21) Appl. No.: 12/783,617

(22) Filed: May 20, 2010

(65) Prior Publication Data

US 2011/0123286 A1   May 26, 2011

Related U.S. Application Data

(60) Provisional application No. 61/179,846, filed on May 20, 2009.

(51) Int. Cl.
*B60P 7/08* (2006.01)
(52) U.S. Cl.
USPC ..................... 410/7; 410/4; 410/87

(58) Field of Classification Search
USPC ............. 410/4, 7, 18, 23, 11, 87, 88, 94, 129; 297/DIG. 4; 296/65.04; 248/503.1
See application file for complete search history.

(56) References Cited

U.S. PATENT DOCUMENTS

| | | | |
|---|---|---|---|
| 4,389,056 A | 6/1983 | Tenniswood | |
| 4,511,171 A | 4/1985 | Petersen | |
| 5,186,585 A | 2/1993 | Sousa | |
| 5,388,937 A | 2/1995 | Farsai | |
| 5,431,524 A * | 7/1995 | Antal et al. | |
| 5,888,038 A | 3/1999 | Ditch | |
| 6,149,528 A | 11/2000 | Volz | |
| 6,231,283 B1 | 5/2001 | Stowers | |
| 7,425,110 B2 | 9/2008 | Ditch | |
| 7,736,104 B2 | 6/2010 | Hobson | |
| 7,854,437 B2 * | 12/2010 | Watters | |
| 7,854,576 B2 * | 12/2010 | Girardin et al. | 410/9 |
| 2008/0079252 A1 | 4/2008 | Shutter | |

\* cited by examiner

*Primary Examiner* — Stephen Gordon
(74) *Attorney, Agent, or Firm* — Bartony & Associates, LLC

(57) ABSTRACT

A system to contain a wheeled mobility device in a vehicle, includes: a rearward opening to allow access by the wheeled mobility device by moving the wheeled mobility device forward relative to the orientation of the wheeled mobility device; a forward barrier positioned opposite the rearward opening and connected to the vehicle to limit forward motion of the wheeled mobility device, the forward barrier including at least one energy absorbing member, and at least a first lateral barrier to limit lateral motion of the wheeled mobility device to a first side.

18 Claims, 10 Drawing Sheets

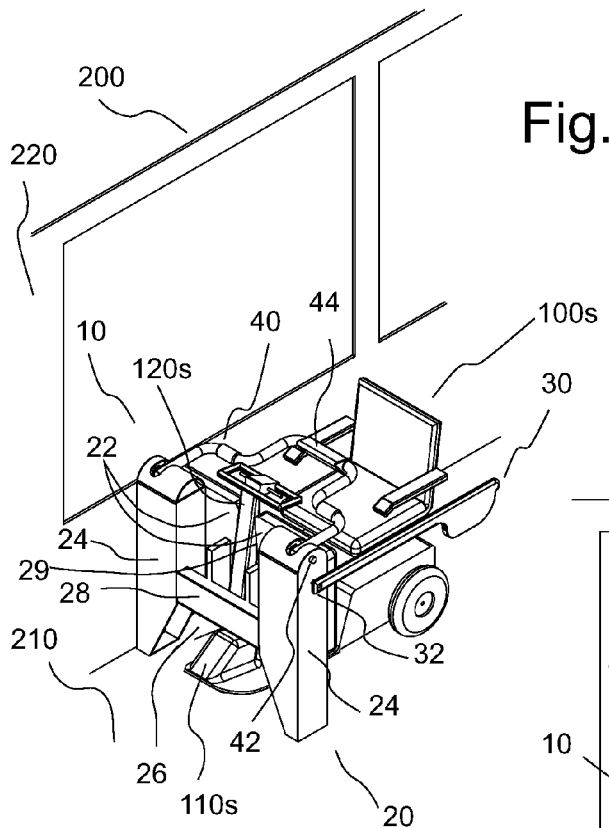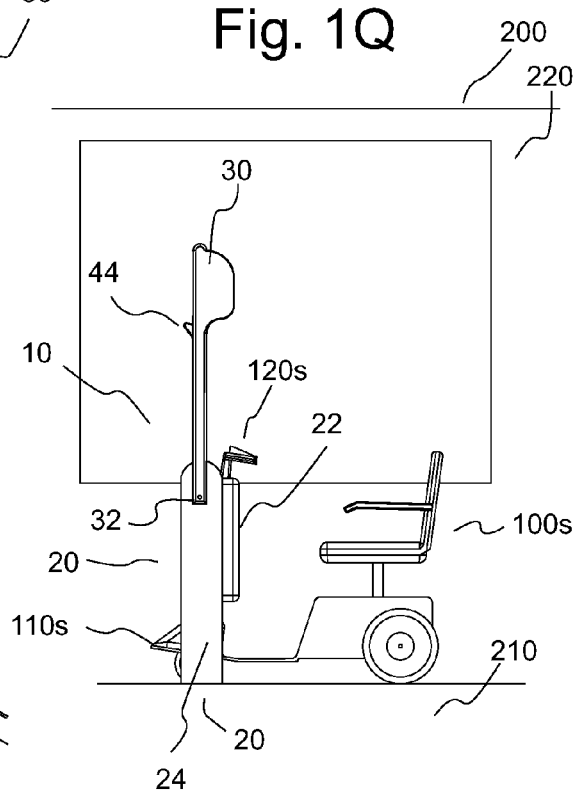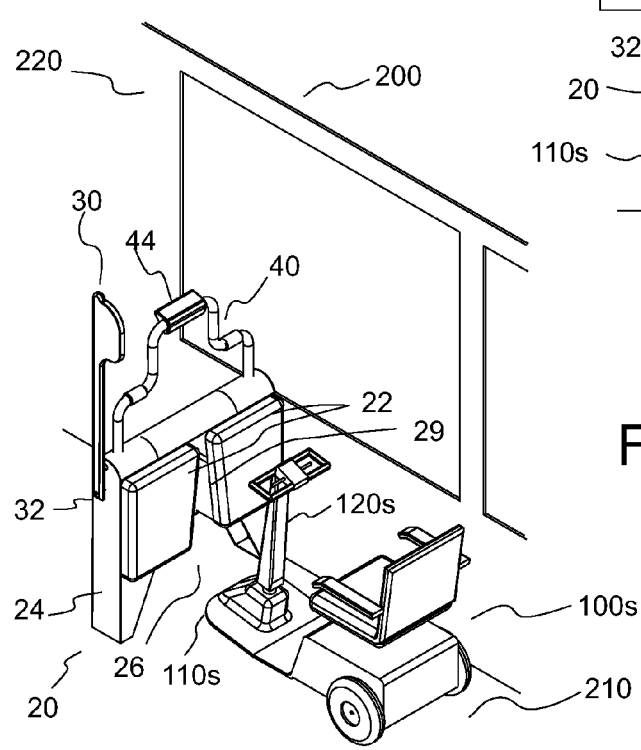

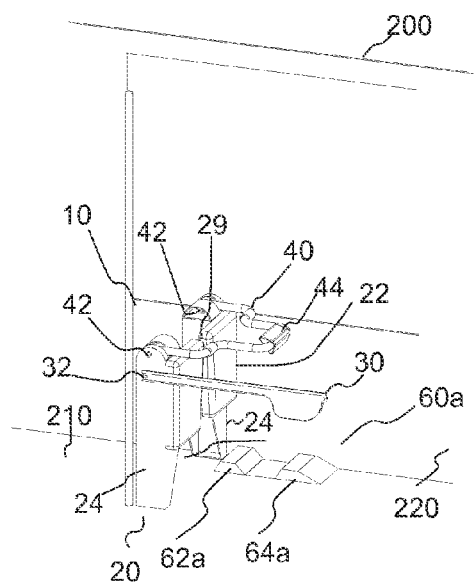
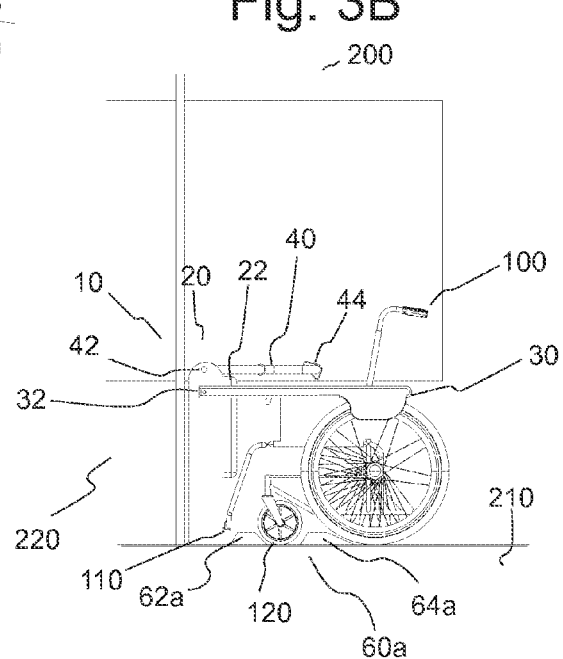
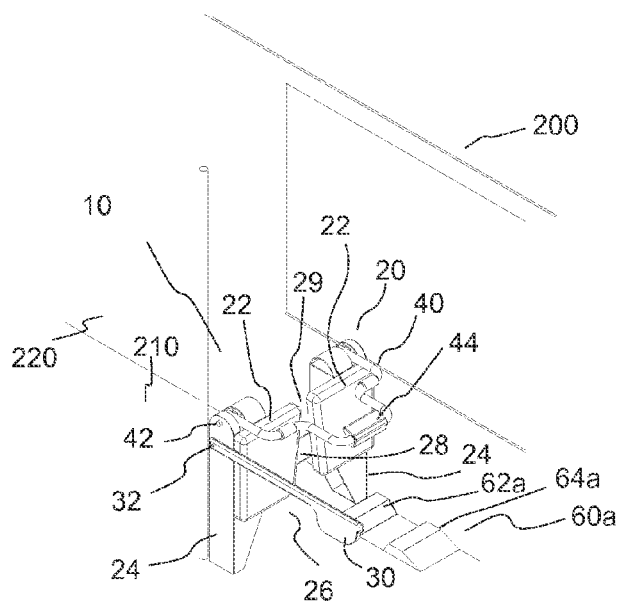

WHEELED MOBILITY DEVICE CONTAINMENT SYSTEMS AND OCCUPANT RETENTION SYSTEMS AND METHODS OF CONTAINING WHEELED MOBILITY DEVICES AND RETAINING OCCUPANTS THEREOF

CROSS-REFERENCE TO RELATED APPLICATIONS

This application claims benefit of U.S. Provisional Patent Application Ser. No. 61/179,846, filed May 20, 2009, the disclosure of which is incorporated herein by reference.

STATEMENT OF GOVERNMENT INTEREST

This invention was made with government support under the Department of Education, National Institute on Disability and Rehabilitation Research Grant No. H133E060064. As such, the United States government has certain rights in this invention.

BACKGROUND

The following information is provided to assist the reader to understand the devices, systems and/or methods disclosed below and the environment in which such devices, systems and/or methods will typically be used. The terms used herein are not intended to be limited to any particular narrow interpretation unless clearly stated otherwise in this document. References set forth herein may facilitate understanding of the devices, systems and/or methods or the background. The disclosure of all references cited herein are incorporated by reference.

A number of systems have been developed to secure wheeled mobility devices and restrain occupants of such wheeled mobility devices in moving vehicles. The term "wheeled mobility device" refers to wheeled devices for providing mobility to individuals of restricted mobility, including, but not limited to, manually propelled wheelchairs, powered wheelchairs, scooters, track systems and the like. Such wheeled mobility devices are sometimes referred to herein collectively as wheelchairs. A number of systems to secure a wheelchair (or other wheeled mobility device) include a four-point tie-down system, which include four straps that attach to the floor of the vehicle (for example, a van or bus) and the frame of the wheelchair. Four-point tie-down systems are effective, but require the bus driver or another person to secure the wheelchair.

Automated docking systems are also available. An automated docking system is an independent system in which a wheelchair user backs into a docking receiver that is securely attached to the floor. The docking system can, for example, include one or more "jaws" that move to "grab" a universal docking geometry. Such universal docking geometries include additional hardware elements, attached the wheelchair frame. Such systems thus require wheelchair users to add hardware to their wheelchairs. Commercially available wheelchairs are not manufactured to include universal hardware elements.

A rear-facing wheelchair passenger station or system is a station or system that requires the wheelchair user to face the rear of the vehicle. In such a system, a wheelchair user backs into a forward excursion barrier, and an arm and block effectively "squeeze" the sides of the wheelchair. The system is effective. However, users dislike facing the rear of the bus. A similar system without powered side plates allows a wheelchair to be freely positioned in the system. However, that system may be unsafe during sharp turns.

SUMMARY

In one aspect, a system to contain a wheeled mobility device in a vehicle, includes: a rearward opening to allow access by the wheeled mobility device by moving the wheeled mobility device forward relative to the orientation of the wheeled mobility device; a forward barrier positioned opposite the rearward opening and connected to the vehicle to limit forward motion of the wheeled mobility device, the forward barrier including at least one energy absorbing member, and at least a first lateral barrier to limit lateral motion of the wheeled mobility device to a first side.

The forward barrier and the first lateral barrier can, for example, be positioned so that a wall of the vehicle provides a barrier to lateral motion of the wheeled mobility device to a second side.

The system can also include a second lateral barrier to limit lateral motion of the wheeled mobility device to a second side.

The system can further include a system to limit motion of the wheeled mobility device in a rearward direction. In a number of embodiments, the system to limit motion of the wheeled mobility device in a rearward direction comprises at least one rearward barrier.

The first lateral barrier can, for example, be movable between a stowed position and a deployed position. The rearward barrier can, for example, be movable between a stowed position and a deployed position.

The system can further include an occupant barrier positionable to be in proximity with a user of the wheeled mobility device when the wheeled mobility device is positioned in cooperation with the system. The occupant barrier can, for example, be pivotable from a stowed position out of proximity with the user into a deployed position in proximity with the user. The occupant barrier can, for example, include at least one energy absorbing member.

The forward barrier can, for example, be positioned so that the wheeled mobility device is facing forward or generally or approximately forward relative to the vehicle when in cooperation with the system.

The at least one lateral barrier can, for example, not contact the wheeled mobility device (or be spaced therefrom) when the wheeled mobility device is in place to be contained by the system.

Similarly, the forward barrier can, for example, not contact (or be spaced from) the wheeled mobility device when the wheeled mobility device is in place to be contained by the system.

In a number of embodiments, the system includes no securement devices for connection to the wheeled mobility device.

The deployed position of the occupant barrier can, for example, be adjustable to account for at least one of varying sizes of occupants and varying occupant positions.

In a number of embodiments, the system includes an occupant barrier positionable to be in proximity with a user of the wheeled mobility device when the wheeled mobility device is positioned in to be in cooperation with or to be contained by the system, wherein the occupant barrier is movable between a stowed position and a deployed position, and wherein at least one of the lateral barrier and the occupant barrier can be moved into the deployed position in a powered manner upon activation of a switch or manually.

The forward barrier can, for example, include an opening to allow position of a forward portion of a scooter within the opening.

In another aspect, a method of containing a wheeled mobility device in a vehicle, includes: providing a rearward opening to allow access by the wheeled mobility device by moving the wheeled mobility device forward; providing a forward barrier positioned opposite the rearward opening and connected to the vehicle to limit forward motion of the wheeled mobility device, the forward barrier including at least one energy absorbing member, and providing at least a first lateral barrier to limit lateral motion of the wheeled mobility device to a first side.

In a further aspect, a method of containing a wheeled mobility device in a vehicle, includes: providing a plurality of barriers adjacent to the wheeled mobility device without connecting any securement device to the wheeled mobility device. At least one of the barriers can, for example, be movable between a stowed position wherein the at least one of the barriers is not adjacent (and in a position to contain) to the wheeled mobility device and a deployed position wherein the at least one of the barriers is adjacent to the wheeled mobility device.

The devices, systems and/or methods, along with the attributes and attendant advantages thereof, will best be appreciated and understood in view of the following detailed description taken in conjunction with the accompanying drawings.

BRIEF DESCRIPTION OF THE DRAWINGS

FIG. 1P illustrates a front dimetric view of the restraint system of FIG. 1A in a deployed state with a scooter in place.

FIG. 1Q illustrates a side view of the restraint system of FIG. 1A in a stowed state with a scooter in place.

FIG. 1R illustrates a rear isometric view of the restraint system of FIG. 1A in a stowed state with a scooter to the rear of the restraint system and aligned to be moved into place within the system.

FIG. 3A illustrates a dimetric view of another embodiment of a containment system in a fully deployed state.

FIG. 3B illustrates a side view of another the restraint system of FIG. 3A in a deployed state with a wheelchair in place for containment.

FIG. 3C illustrates an isometric view of the restraint system of FIG. 3A in a deployed state.

DETAILED DESCRIPTION

Figure 1A:
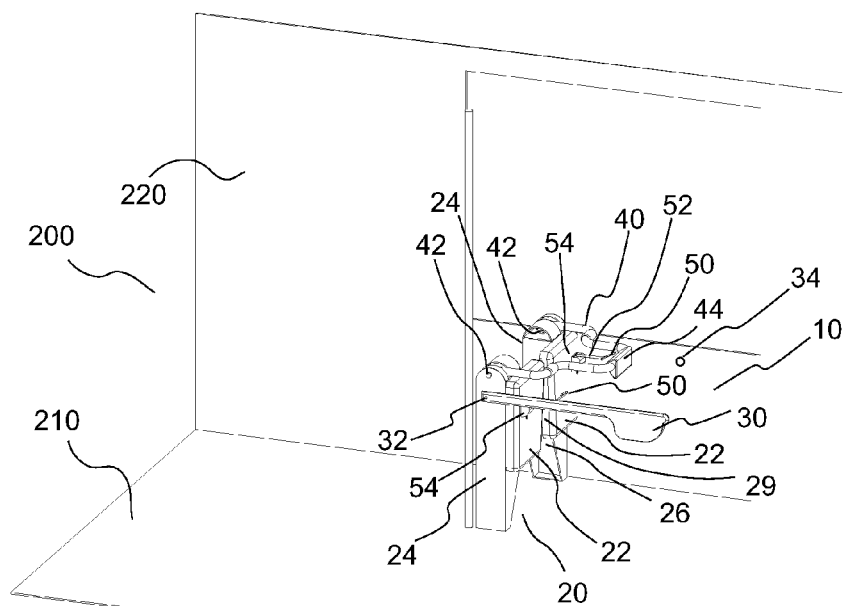
FIG. 1A illustrates a dimetric view of a representative embodiment of a retention or restraint system in a deployed state.

As used herein and in the appended claims, the singular forms "a," "an", and "the" include plural references unless the content clearly dictates otherwise. Thus, for example, reference to "an abutment member" includes a plurality of such abutment members and equivalents thereof known to those skilled in the art, and so forth, and reference to "the abutment member" is a reference to one or more such abutment members and equivalents thereof known to those skilled in the art, and so forth.

As used herein, the terms "restrain," "restraint" and variants thereof refers to a methods, devices and/or systems employed in actively holding an occupant in place with (for example, a seat belt). As used herein, the terms "retain", "retention" and variants thereof refer to methods, devices and/or systems employed to hold an occupant in place, while not necessarily touching or restraining the occupant, but prevent an occupant from excessive movement (for example, an armrest can be or form part of a retention device). As used herein, the terms "secure", "securement" and variants thereof refer to methods, devices and/or systems employed to physically attach to a wheelchair or other wheeled mobility device to anchor the wheeled mobility device to the vehicle structure and to prevent movement thereof (for example, a tiedown, a strap, a hook, a force application member etc.). As used herein, the terms "contain", "containment" and variants thereof refer to methods, devices and/or system employed to generally passively prevent excessive movement of a wheelchair or other wheeled mobility device when forces act upon the wheeled mobility device to cause it to move (for example, slide or tip). A containment device need not contact the wheeled mobility device or apply force to the wheelchair when in contact with the wheeled mobility device (before such a force is experienced) A containment device need only be positioned adjacent a wheeled mobility device to abut the wheeled mobility device when motion is imparted to the wheeled mobility device via an experienced force (for example, upon abrupt deceleration, acceleration or turning of a vehicle) to limit the motion of the wheeled mobility device.

In several embodiments, devices, systems and methods described herein relate to containment of wheeled mobility devices (wheelchairs, scooters and the like, which are sometimes referred to collectively herein as wheelchairs) and retention of occupants thereof while in, for example, in moving vehicles. In several embodiments, devices and systems described herein contain wheelchairs (that is, prevent excessive movement thereof) and retain wheelchair occupants travelling in, for example, large accessible transit vehicles (LATVs) such as buses or vans. In a number of embodiments, wheelchair users can use the devices and systems in a forward facing direction (relative to the orientation of the vehicle). Further, in a number of embodiments, the wheelchair can enter into connection with the devices and systems while the wheelchair occupant is traveling facing towards the front of the vehicle. Although such devices and/or systems are particularly adapted for use with a wheelchair oriented in a forward facing direction (relative to the vehicle), the devices and/or systems can also be oriented opposite to the direction of the vehicle, such that the wheelchair occupant is facing rearward with respect to the vehicle. In several embodiments, no additional brackets and/or other specialized connectors are required on the wheelchair to use the devices and system. The devices and system can, for example, be used independently (that is, without assistance) by wheelchair users that ride in LATVs. In several embodiments the devices and systems include at least three abutment members, barriers or barrier systems to contain, stabilize, retain and/or limit motion of the wheelchair and/or occupant.

Figure 1B:
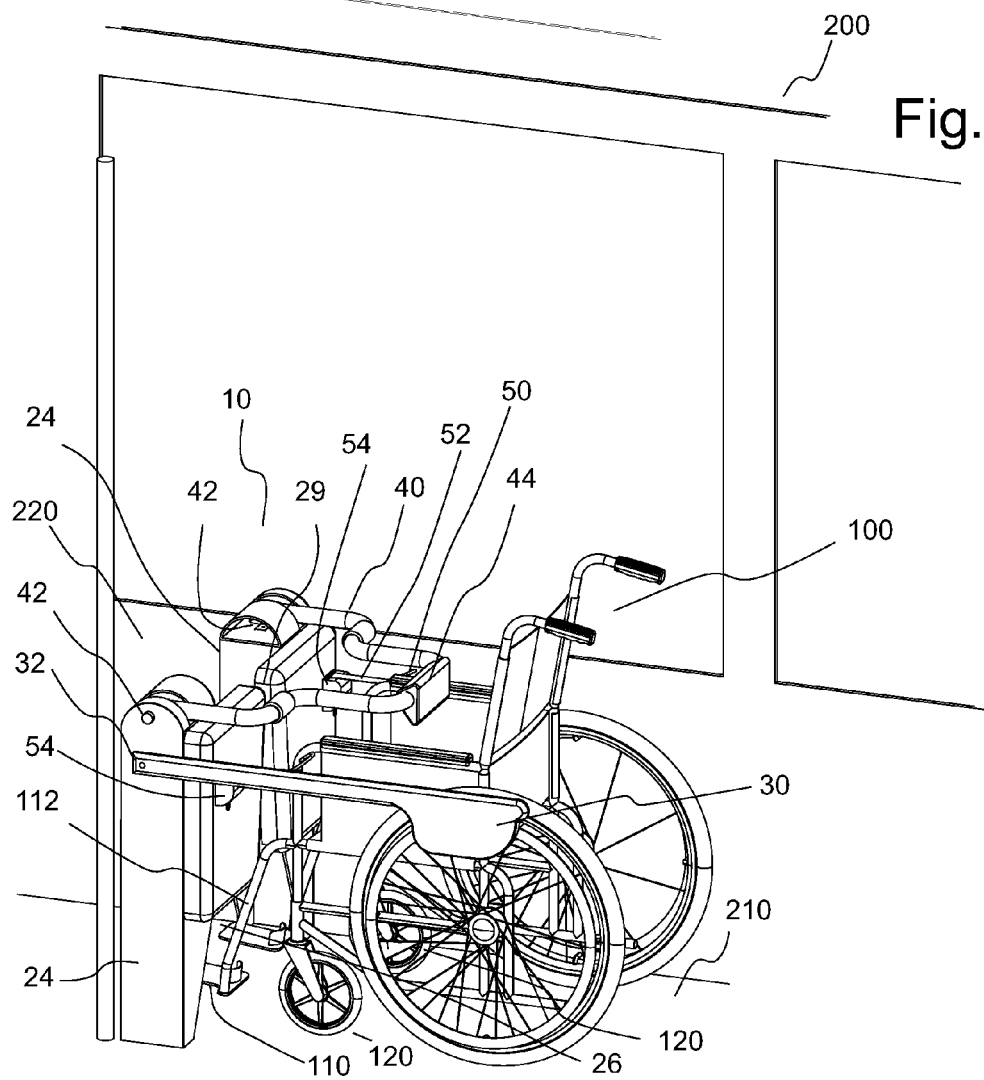
FIG. 1B illustrates a dimetric view of the restraint system of FIG. 1A with a wheelchair in place.
Figure 1C:
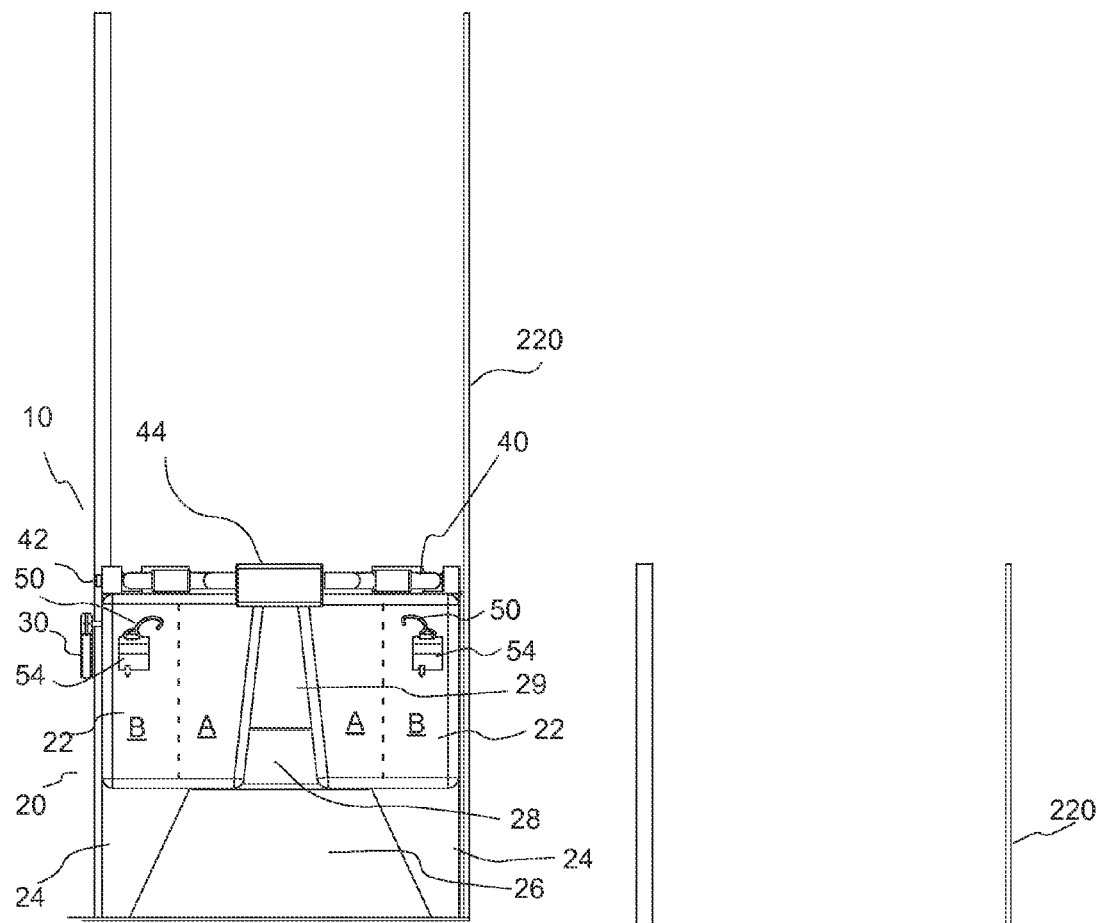
FIG. 1C illustrates a front view of the restraint system of FIG. 1A in a deployed state.
Figure 1D:
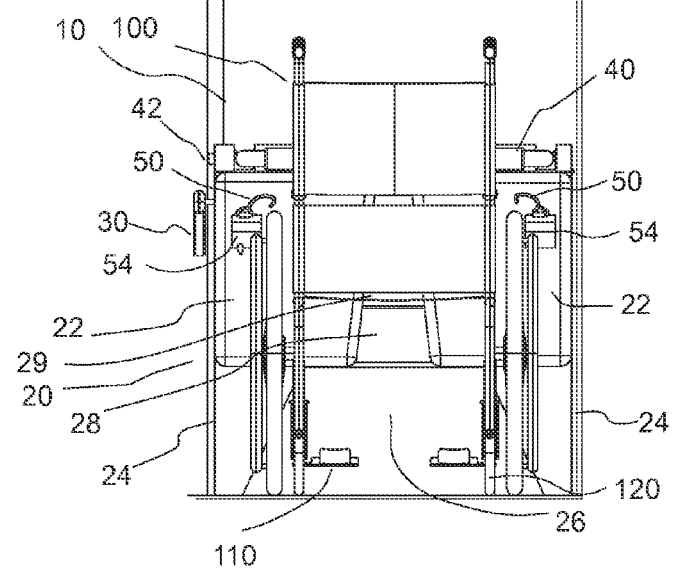
FIG. 1D illustrates an isometric view of the restraint system of FIG. 1A in a deployed state with a wheelchair in place.

One representative embodiment of a system 10 is illustrated in FIGS. 1A through 1R. System 10 includes a forward (with respect to the orientation of the wheelchair to be contained) excursion barrier or barrier system 20 that prevents a wheelchair 100 from rolling/sliding forward and prevents wheelchair seated occupants from sliding forward and onto a floor 210 of a vehicle 200 in the event of a sudden vehicle deceleration or stop (in the case that system 10 is orientate so that wheelchair 100 is orientate in generally the same directions as vehicle 200). In the illustrated embodiment, barrier 20 includes two energy absorbing, generally vertically oriented abutment structures 22 that are connected to and supported by supports or posts 24. Abutment structures 22 can, for example, be positioned to contact the occupant's knees and/or shins or to contact a component of the wheelchair 100 (see, for example, FIG. 1b) such as a footrest 110 or an extending member 112 to which footrest 110 is attached or a member of the wheelchair seat frame. In several embodiments, barrier system 20 is constructed to stop forward movement of the wheelchair before stopping forward movement of the occupant to reduce the likelihood of injury to the occupant. Abutment structure 22 can, for example, be formed of or include one or more energy absorbing elements or members that can, for example, include of be formed from a resilient polymeric material such as a foamed polymer (for example, polystyrene and/or polyurethane) and/or elastomeric polymers as known in the energy absorbing arts. Such energy absorbing elements can, for example, elastically and/or permanently deform to absorb energy. Further, shock absorbing connectors as known in the art can be connected to abutment structures 22. With reference to FIG. 1C, energy absorbing abutment structures 22 can, for example, allow greater energy absorbing deformation in an area A, in which an occupant's knees contact abutment structures 22, than in an area B, in which a component of wheelchair 100 contacts abutment structures 22. Energy absorbing padding can, for example, be thicker and/or less stiff in area A than in area B.

Forward excursion barrier system 20 can, for example, include an opening 26 in the middle thereof (between posts 24 and abutment structures 22) that can be temporarily opened (for example, closed or partially closed by movable or flexible elements or coverings) or permanently opened to, for example, allow a scooter-type wheeled mobility device to move further forward and contact abutment structure or member 28 which can, for example, be attached to and span the distance between posts 24 of excursion barrier 20. Supports 24 can, for example, be bolted to floor 210 of vehicle 200 (illustrated schematically in the figures) or be integrated into existing floor tracks.

System 10 further includes at least one lateral barrier 30, which can, for example, be movable (for example, pivotable) downward from a generally vertical or stowed position (see, for example, FIG. 1M) into a generally horizontal deployed or operational position (see, for example, FIG. 1A) to prevent wheelchair 100 from tipping sideways or sliding (for example, into the isle of vehicle 200) during a sharp vehicle turn. Lateral barrier 30 need not be in contact with wheelchair 100 when deployed, but should be sufficient close to wheelchair 30 to prevent substantial lateral movement thereof. For example, the space between lateral barrier 30 and wheelchair 100 (as well as the space between vehicle wall 220 and wheelchair 100, when vehicle wall 220 forms one lateral barrier) can be between approximately 1 to 4 inches. The distance between wall 220 and wheelchair 100 can, for example, vary if there is a flip-up seat 230 (illustrated in dashed lines in FIG. 1F) mounted to vehicle wall 100. Lateral barrier 30 as well as forward barrier 20 are containment devices or systems as described above and need only be positioned adjacent wheelchair to abut the wheeled mobility device when motion is imparted to the wheeled mobility device via an experienced force (for example, upon abrupt deceleration, acceleration or turning of a vehicle) to limit the motion of the wheeled mobility device. Unlike a number of currently available devices for use in connection with wheelchairs in vehicles, there is no need to move the containment barriers for use in system 10 into contact with wheelchair 10 to immobilize wheelchair 100 upon initial placement of wheelchair 100 in system 10.

In the illustrated embodiment, a generally U-shape or V-shaped lateral barrier 30 is pivotably connected to support 24 via connectors 32 in the vicinity of the ends thereof. Alternatively, such a lateral barrier or barriers can be fixed in position. Lateral barrier 30 barrier can, for example, be activated to pivot downward into a generally horizontal or operational position via a wall-mounted control 34 (see FIG. 1A) or manually pivoted downward. Lateral barrier 30 can, for example, be stowed by means of a torsion spring, a motor, manually operated, or can be permanently placed in a deployed position (see FIG. 1E). In the representative embodiment of FIGS. 1A through 1R, the wheelchair user is traveling in a forward facing position when entering system 10. A lateral or side vehicle wall 220 is adjacent to a first side of wheelchair 100 (to prevent tipping or sliding in the direction of the first side). Lateral wheelchair barrier 30 is adjacent the other or second side of wheelchair 100 (to prevent tipping or sliding in the direction of the second side). A second lateral wheelchair barrier (not shown, but which can be similar to or identical to lateral barrier 30) can be used on the first side of wheelchair 100 if the wheelchair 100 is not to be positioned suitably close to a vehicle wall.

An optional occupant barrier or barrier system 40 can, for example, be pivotable down into proximity with, for example, the wheelchair user's lap in a manner similar to the pivoting of lateral wheelchair barrier 30 (or barriers) into a deployed position. In the illustrated embodiment, occupant barrier 20 is pivotably connected to supports 24 via connectors 42. Occupant barrier 40 prevents the occupant from sliding forward during a sudden stop of vehicle 200 and can also provide a handhold for occupant stabilization during the ride. In a number of embodiments occupant barrier 40 can function to prevent forward movement of the occupant within wheelchair 100 and function to abut an armrest or other frame portion of wheelchair 100 to prevent forward wheelchair movement.

As set forth above, occupant barrier 40 can be optional and can, for example, be moved out of the way during emergencies or if desired by the wheelchair user. See, for example, FIGS. 1I through 1L). Occupant barrier 40 can, for example, be provided with one or multiple energy-absorbing members such as abutment member 44 (for example, including energy-absorbing padding) to limit forces upon the occupant during forward movement of the occupant onto contact with occupant barrier 40. Occupant barrier 40 can also be adjustable (for example, via one or more telescoping sections or hinging sections) to bring occupant barrier 40 closer to or farther away from, or higher or lower relative to a seated occupant. Occupant barrier 40 can, for example, be designed (for example, to be U- or V-shaped so that it fits over or around (or otherwise does not interfere with) a range of scooter-type wheelchair steering columns (tillers). Occupant barrier 40 can, for example, be configured to include one structure or more than one structures.

FIGS. 1P through 1R illustrates how a representative embodiment of a scooter-type wheeled mobility device or scooter 100s can be contained by system 10. As described above, a front section 110s of scooter 100s can be positioned within opening 26. Scooter 100s also includes a center mounted steering column (or tiller) 120s. In the illustrated embodiment, an occupant of scooter 100s drives scooter 100s forward into system 10 with a steering column 120s passing through an opening 29 between abutment structures 22, which (in the illustrated embodiment) connects to opening 28, and which can be temporarily opened (for example, closed or partially closed by movable or flexible elements or coverings) or permanently opened, until, for example, steering column 120s is stopped/abutted by a member 28 that is positioned rearward of abutment structures 22 or the occupant contacts the abutment structures 22 with their knees. For scooter-type wheeled mobility devices having a steering column similar to steering column 120s, abutment of the steering column with the inner sides of abutment structures 22 prevents excessive lateral movement of the scooter. Additionally, lateral movement of a scooter-type wheeled mobility device is prevented by abutment with vertical structure members or posts 24 that are positioned lateral to and partially define opening 26. Scooter-type wheeled mobility devices such as scooter 100s are typically longer or more forward-extending relative to the occupant than wheelchair-type wheeled mobility device. Opening 29 and/or opening 26 assist in positioning a scooter-type wheeled mobility device and the occupant within system 10 to adequately contain the wheeled mobility device and retain the occupant (via, for example, occupant barrier 40 and/or other device) within system 10.

System 10 can further optionally include at least one system or device that limits or prevents rearward rolling (in the case of a manual wheelchair) or sliding of wheelchair 100. In FIGS. 1A through 1R, a hook or other connector 50 is attached to an extending piece of webbing or other length of material 52, which can, for example, be retractably wound within a breaking system 54 as known in the art, which locks extension of webbing or cable 52 in the case of a threshold force thereon or experiencing of a threshold acceleration. Connector 50 can, for example, attached to any part of wheelchair 100.

Figure 2A:
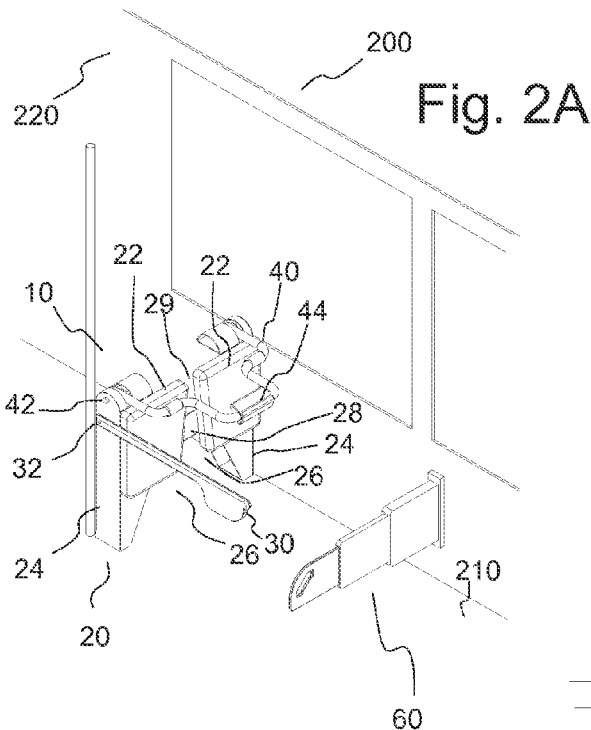
FIG. 2A illustrates an isometric view of another embodiment of a rear containment system in a fully deployed state.
Figure 2B:
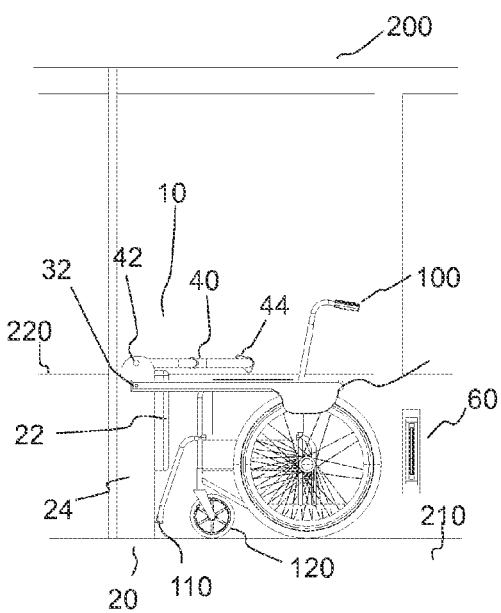
FIG. 2B illustrates a side view of another rear containment system of FIG. 2A in a deployed state with a wheelchair in place for containment.
Figure 2C:
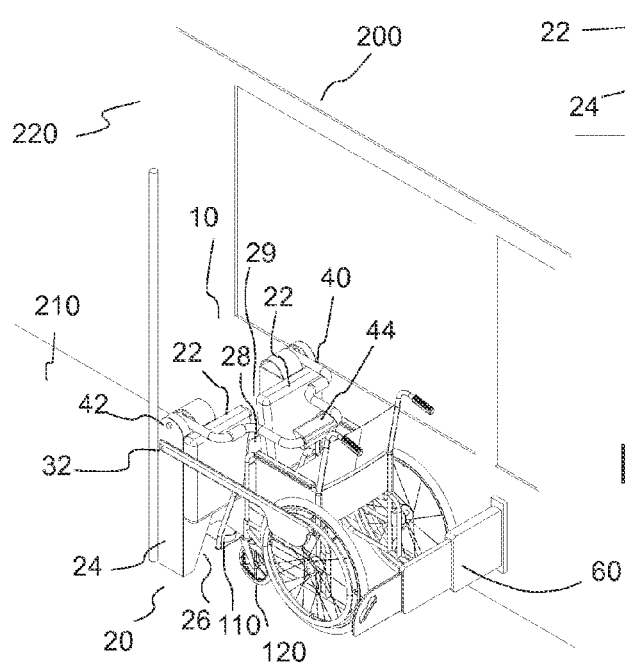
FIG. 2C illustrates an isometric view of the restraint system of FIG. 2A in a deployed state with a wheelchair in place for containment.

Alternatively, a system or device to prevent rearward movement (for example, rolling or sliding) can be can be mounted on vehicle 200 rearward of wheelchair 100. For example, FIGS. 2A through 2C illustrate a system 60 which can, for example, be manually or automatically moved (for example, pivoted or telescoped) into position rearward of wheelchair 100 (or other wheeled mobility device) to abut wheelchair 100 and limit or prevent rearward movement thereof. In the embodiment illustrated in FIGS. 2A through 2C, system 60 includes telescoping section for transition between a stowed and a deployed position. Other embodiments can, for example, include a retractor with a piece of belt webbing that connects to a receptacle on the lateral barrier.

Additionally or alternatively, a system or structure to limit or prevent rearward movement of wheelchair 100 can be positioned on or deployable from the floor of vehicle 200 to capture one or more wheels of wheelchair 100. FIGS. 3A through 3C, for example, illustrate an embodiment of a system 60a positioned on or deployable from the floor of vehicle 300 and including a forward abutment member 62a and a rearward abutment member 64a. One front wheel 120 of wheelchair 100 is positioned between the forward abutment member 62a and rearward abutment member 64a when wheelchair 100 is positioned to be contained by system 10. Rearward abutment member 64a can, for example, include a sloped surface so that front wheel 120 of wheelchair 100 can more readily pass thereover during movement of wheelchair 100 into position to be contained by system 10. In the illustrated embodiment, one system 60a is positioned on the vehicle wall side or first side of system 10. A second system 60a can be positioned on the second side of system 10 to cooperate with a second front wheel 120 of wheelchair 100.

Figure 1E:
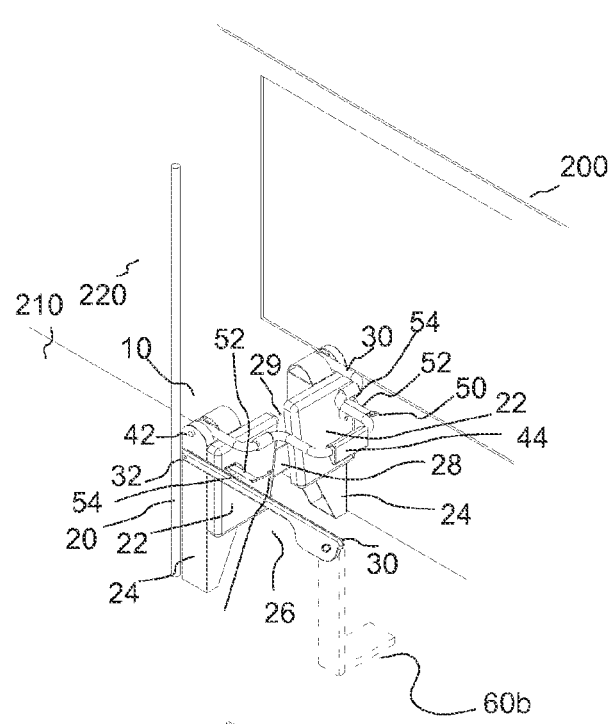
FIG. 1E illustrates an isometric view of the restraint system of FIG. 1A in a deployed state.
Figure 1F:
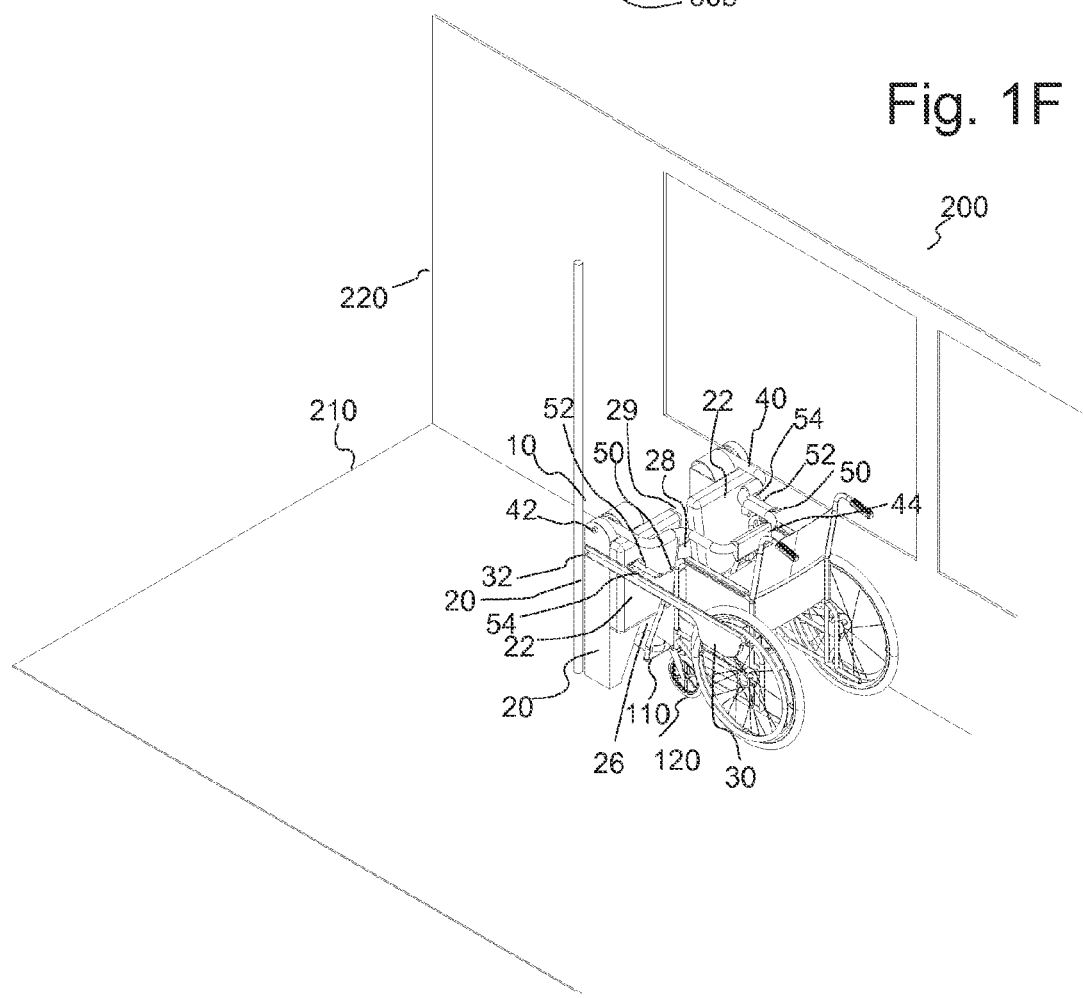
FIG. 1F illustrates an isometric view of the restraint system of FIG. 1A in a deployed state with a wheelchair in place.
Figure 1G:
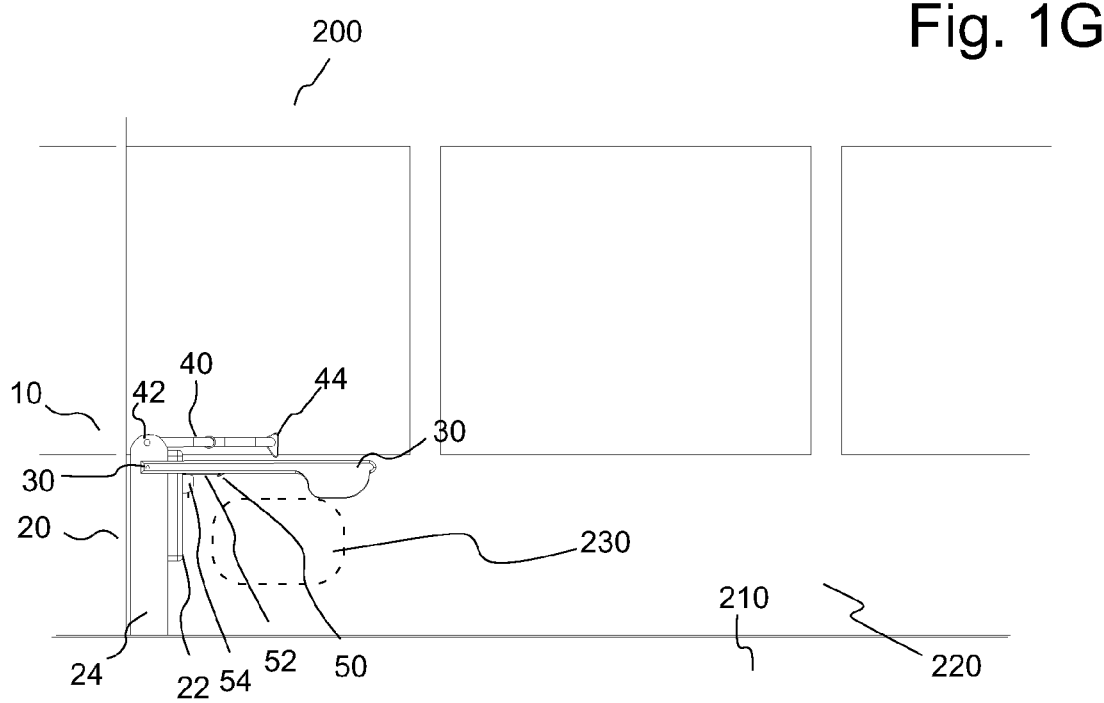
FIG. 1G illustrates a side view of the restraint system of FIG. 1A in a deployed state.
Figure 1H:
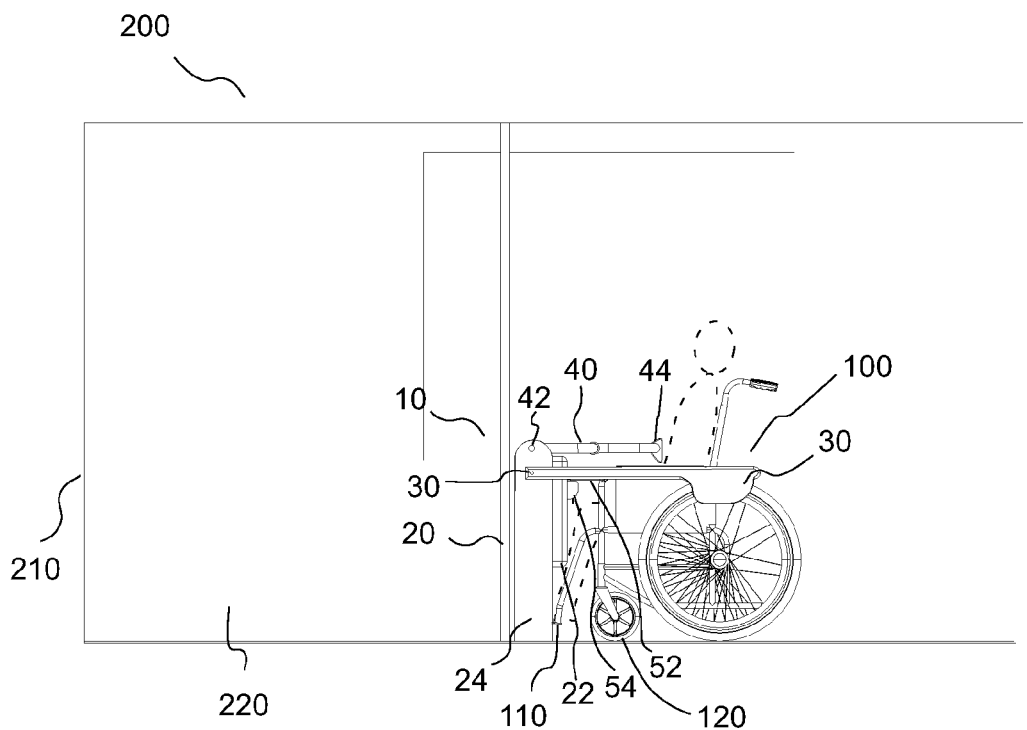
FIG. 1H illustrates a side view of the restraint system of FIG. 1A in a deployed state with a wheelchair in place.
Figure 1I:
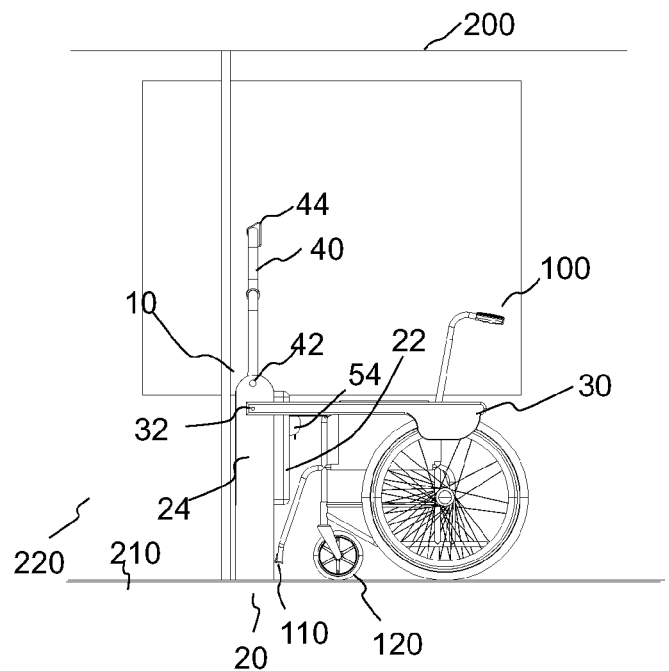
FIG. 1I illustrates a side view of the restraint system of FIG. 1A in a partially deployed state with an occupant barrier raised to a stowed state.
Figure 1J:
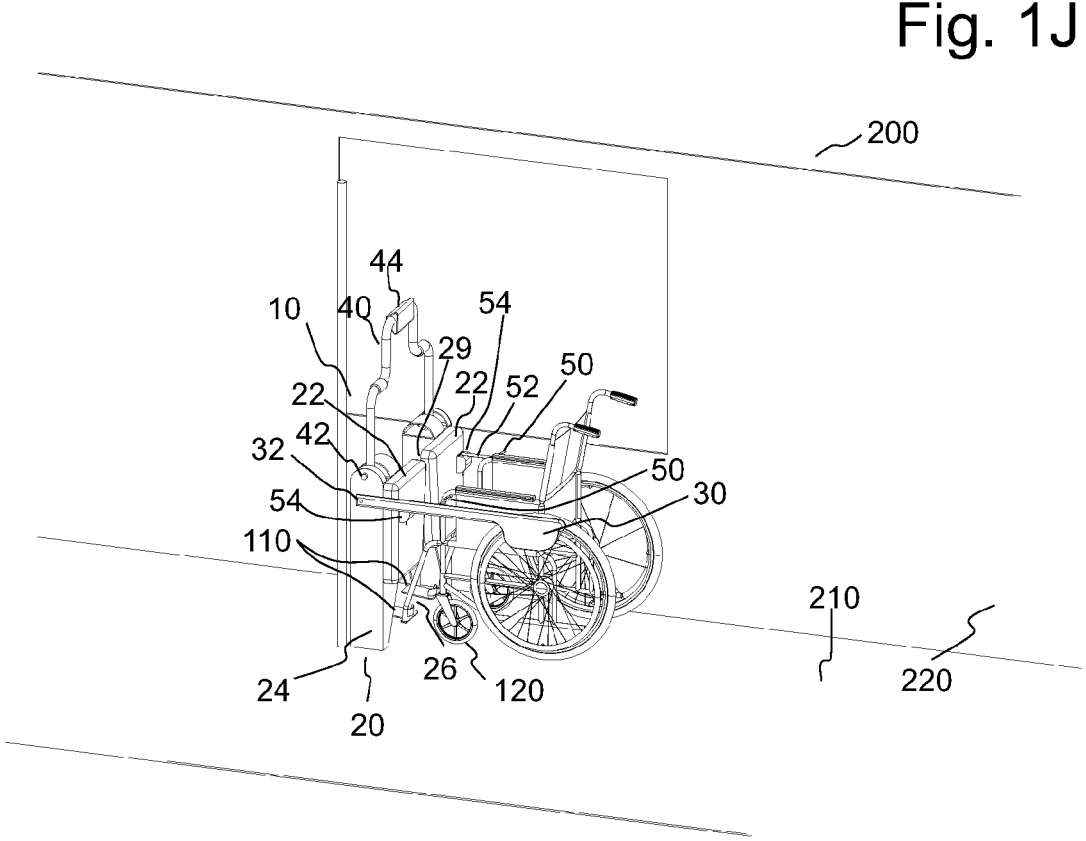
FIG. 1J illustrates a dimetric view of the restraint system of FIG. 1A in a partially deployed state with an occupant barrier raised to a stowed state and a wheelchair in place.
Figure 1K:
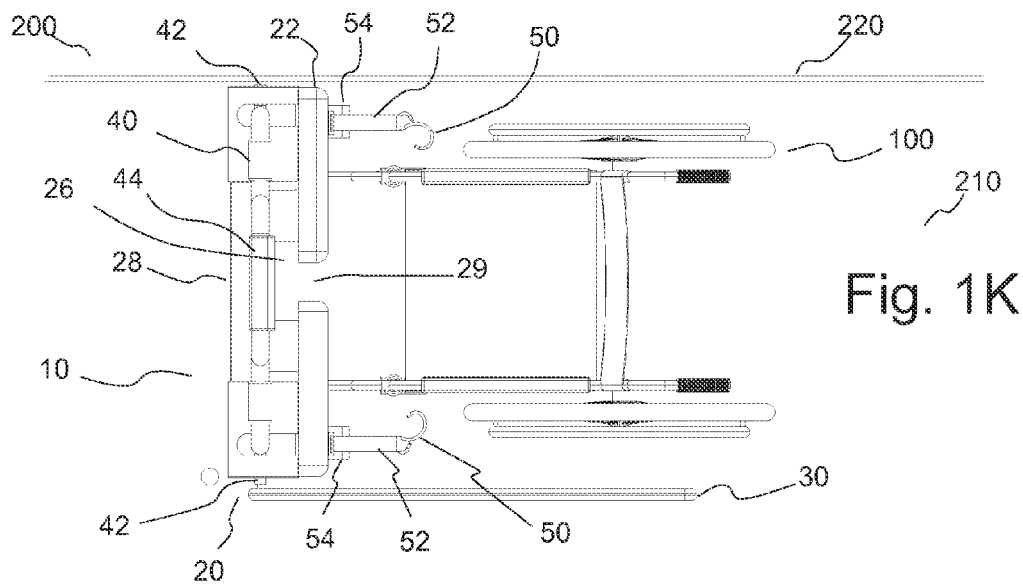
FIG. 1K illustrates a top view of the restraint system of FIG. 1A in a partially deployed state with an occupant barrier raised to a stowed state.
Figure 1L:
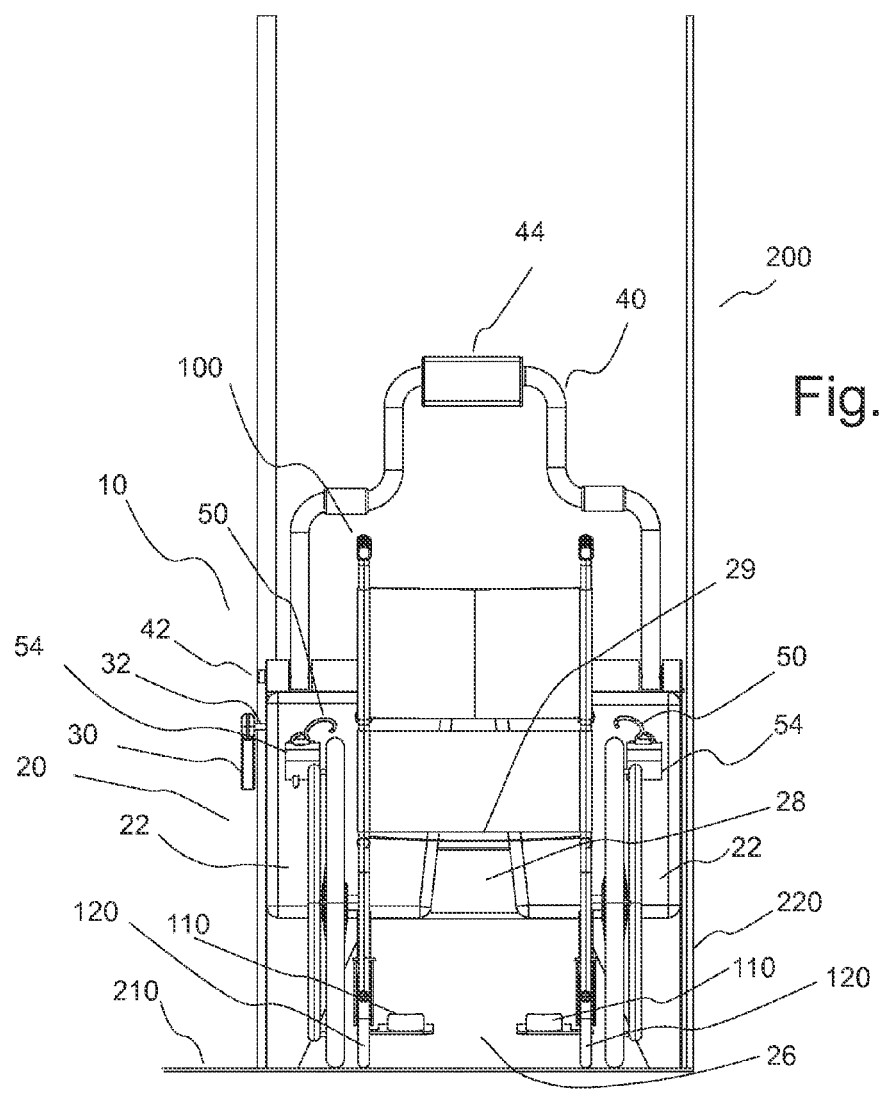
FIG. 1L illustrates a front view of the restraint system of FIG. 1A in a partially deployed state with an occupant barrier raised to a stowed state.
Figure 1M:
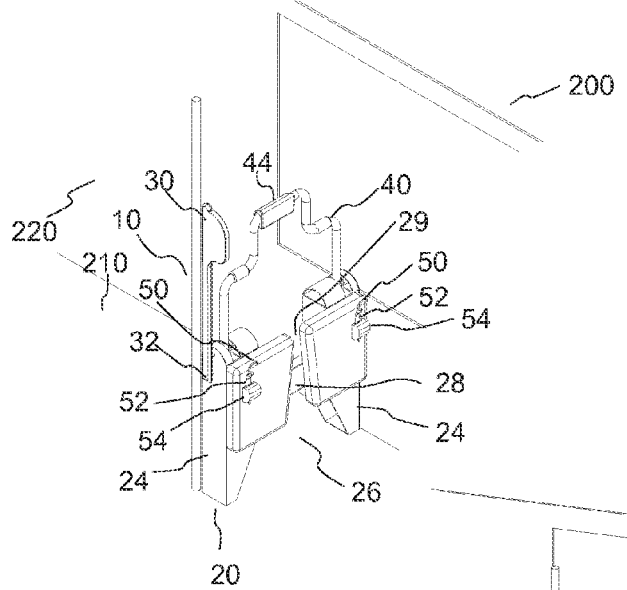
FIG. 1M illustrates an isometric view of the restraint system of FIG. 1A in a fully stowed state.
Figure 1N:
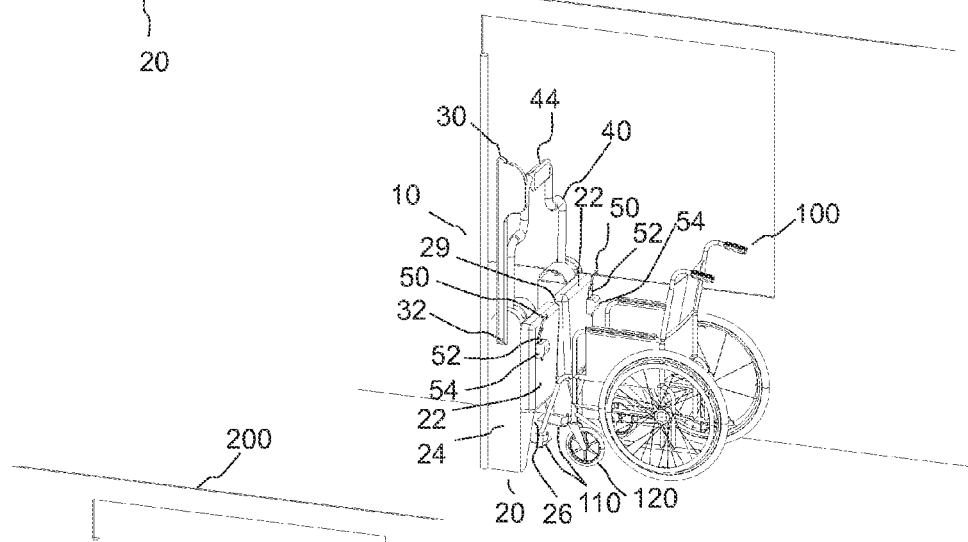
FIG. 1N illustrates a dimetric view of the restraint system of FIG. 1A in a fully stowed state and a wheelchair in place.
Figure 1O:
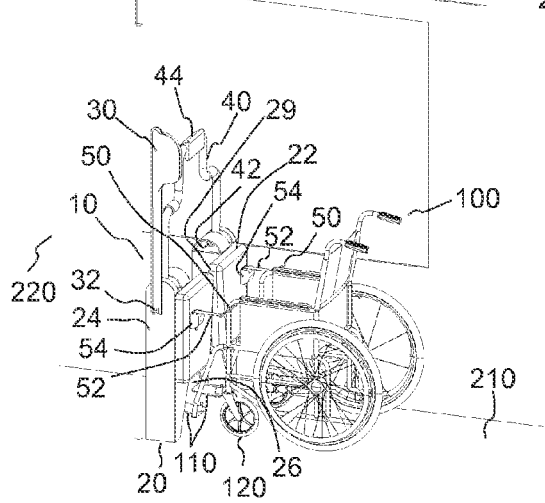
FIG. 1O illustrates a dimetric view of the restraint system of FIG. 1A in a partially stowed state with lateral tie-downs attached to a wheelchair in place for restraint.

A system can also be integrated with or connected to the lateral barrier 30 or occupant retention barrier or bar 40. For example, FIG. 1E illustrates (schematically) a system 60b to limit or prevent rearward movement of the wheelchair 100.

Once user of the wheelchair 100 (or other wheeled mobility device) positions the wheelchair 100 within the system or station 10, the wheelchair 100 is limited in movement on at least three sides (front, left and right), and on four sides (front, left, right and rear side) in the case that a system such as system 60 or connector 50 is provided to limit or prevent rearward movement. System 10 prevents excessive movement of the wheelchair in the event of quick decelerations/stops, sharp turns or quick accelerations. To exit system 10, the user can, for example, activate switch 34 to deploy one or more barriers of system 10 in a powered manner (for example, using one or more electric motors, hydraulic systems, and/or pneumatic systems) or manually activate the system through the use of, for example, a torsion or other springs or counterbalancing. Lateral barrier 30, optional occupant restraint barrier or bar 40, and any optional rearward stop or barrier system can, for example, be powered to transition to a stowed position upon activation of switch 34 to allow for quick, easy and independent exit from the station by the wheelchair user. A switch can, for example, be integrated with or in operative connection with the vehicle operator control system if a wheelchair occupant is unable to activate a local switch such as switch 34. A switch can also be integrated or incorporated into, for example (knee) retention or abutment surface or member 22 so that system 10 is automatically activated when a wheelchair occupant enters system 10 and contact is made with forward excursion barrier 20. In a number of embodiments, no mechanical interconnections are required between containment system 10 and any hardware on the wheelchair. The barriers of system 10 can, for example, be in close proximity to the wheelchair 100 and/or the occupant thereof and constrain or restrict motion of the wheelchair 100 and/or the occupant via abutting contact.

The use of system 10 can, for example, be independent of the driver of vehicle 200 or any other assistant. Wheelchairs, scooters and other wheeled mobility devices can simply roll into system 10, without the need for assistance or the need for specially equipped wheelchairs, scooters and other wheeled mobility devices. Although currently available systems such as automated docking systems, or rear-facing wheelchair passenger systems can sometimes provide user independence, the devices, systems and methods described herein are much simpler in design and implementation. Furthermore, unlike such previous systems. the devices, systems and methods described herein do not require the wheelchair user to face rearwards, or to attach additional hardware to the wheelchair 100 to allow independent securement. Still further, the devices, systems and methods described herein can also be used along with currently available four-point tie-down system.

Rear stop or barrier system such as connectors 50 or systems 60, 60a and 60b can be particularly useful in connection with wheelchairs that are manually propelled. The rear stop or barrier system may not be required for wheelchairs including reliable mechanical wheel brakes to prevent rolling of the wheelchair during the ride. However, even in the case of a wheelchair with mechanical brakes, a rear stop or barrier system can also be used to prevent or limit, for example, rearward sliding in, for example, the case of a quick deceleration of the vehicle 200.

Passive occupant retention or barrier 40 provides the wheelchair passenger with additional safety during travel as compared to currently available occupant restraint systems which rely on belt-type restraints for pelvic and upper torso restraint. Such belt systems are rarely used, and wheelchair seated passengers often slide from their wheelchair seats onto the vehicle floor, sustaining injury to lower and upper extremities. The devices, systems and methods described herein make use of a simple occupant barrier or bar (such as barrier 40), which can, for example, include padded or energy absorbing abutment member strategically placed upon the front of occupant excursion barrier 40 to limit or prevent the occupant from sliding forward in his/her seat during a quick vehicle deceleration or stop. Occupant barrier 40 can also be used to hold onto within reach of the wheelchair-seated passenger and to provide postural support during, for example, a bumpy vehicle ride. Currently available systems do not provide hand holds that are within close proximity and in front of wheelchair seated occupants.

The foregoing description and accompanying drawings set forth representative embodiments. Various modifications, additions and alternative designs will, of course, become apparent to those skilled in the art in light of the foregoing teachings without departing from the scope hereof, which is indicated by the following claims rather than by the foregoing description. All changes and variations that fall within the meaning and range of equivalency of the claims are to be embraced within their scope.

What is claimed is:

1. A system to contain a wheeled mobility device which is occupied by a user in a vehicle, wherein the wheeled mobility device includes a wheelchair-type wheeled mobility device or a scooter-type wheeled mobility device, comprising:
    a rearward opening to allow access by the wheeled mobility device and the user occupying the wheeled mobility device by moving the wheeled mobility device forward relative to an orientation of the wheeled mobility device;
    a forward barrier positioned opposite the rearward opening and connected to the vehicle to limit forward motion of the wheeled mobility device, the forward barrier including at least one energy absorbing member, the forward barrier being positioned to be in contact with at least one of the wheeled mobility device or the occupant when the wheeled mobility device is contained by the system to prevent excessive forward movement of the wheeled mobility device via abutment with at least one of the wheeled mobility device or with the occupant upon forward movement of the wheeled mobility device, the forward barrier comprising a generally central opening therein adapted to seat a tiller of the scooter-type wheeled mobility device, the energy absorbing member absorbing energy upon abutment of at least one of the wheeled mobility device or the occupant upon forward movement of the wheeled mobility device, and
    at least a first lateral barrier to limit lateral motion of the wheeled mobility device to a first side, the first lateral barrier being positioned to be in close proximity to the wheeled mobility device when the wheeled mobility device is contained by the system to prevent excessive lateral movement of the wheeled mobility device in the direction of the first lateral barrier via abutment therewith upon lateral movement of the wheeled mobility device toward the first lateral barrier.

2. The system of claim 1 wherein the forward barrier and the first lateral barrier are positioned so that a wall of the vehicle provides a barrier to lateral motion of the wheeled mobility device to a second side.

3. The system of claim 1 further comprising a second lateral barrier to limit lateral motion of the wheeled mobility device to a second side.

4. The system of claim 1 further comprising a system to limit motion of the wheeled mobility device in a rearward direction.

5. The system of claim 4 wherein the system to limit motion of the wheeled mobility device in a rearward direction comprises at least one rearward barrier.

6. The system of claim 1 wherein the first lateral barrier is movable between a stowed position and a deployed position wherein the first lateral barrier is positioned to be in close proximity to the wheeled mobility device when the wheeled mobility device is contained by the system.

7. The system of claim 5 wherein the rearward barrier is movable between a stowed position and a deployed position.

8. The system of claim 1 further comprising an occupant barrier positionable to be in proximity with the user of the wheeled mobility device when the wheeled mobility device is positioned in cooperation with the system, the occupant barrier being movable between a stowed position and a deployed position.

9. The system of claim 8 wherein the occupant barrier is pivotable from the stowed position out of proximity with the user into the deployed position in proximity with the user.

10. The system of claim 9 wherein the occupant barrier comprises at least one energy absorbing member.

11. The system of claim 1 wherein the forward barrier is positioned so that the wheeled mobility device is facing forward relative to the vehicle when in cooperation with the system.

12. The system of claim 1 wherein the at least one lateral barrier does not contact the wheeled mobility device when the wheeled mobility device is in place to be contained by the system.

13. The system of claim 1 wherein the forward barrier does not contact the wheeled mobility device when the wheeled mobility device is in place to be contained by the system.

14. The system of claim 1 wherein no securement devices are required for connection to the wheeled mobility device.

15. The system of claim 8 wherein a deployed position of the occupant barrier is adjustable to account for at least one of varying sizes of occupants and varying occupant positions.

16. The system of claim 5 further comprising an occupant barrier positionable to be in proximity with a user of the wheeled mobility device when the wheeled mobility device is positioned in cooperation with the system, the occupant barrier being movable between a stowed position and a deployed position, wherein at least one of the lateral barrier and the occupant barrier can be moved into the deployed position in a powered manner upon activation of a switch or manually.

17. The system of claim 1 wherein the forward barrier includes the generally central opening to allow position of a forward portion of a scooter within the generally central opening.

18. A method of using a system by containing a wheeled mobility device and a user occupying the wheeled mobility device in a vehicle, wherein the wheeled mobility device includes a wheelchair-type wheeled mobility device or a scooter-type wheeled mobility device, comprising:
   providing a rearward opening to allow access by the wheeled mobility device and the user occupying the wheeled mobility device by moving the wheeled mobility device forward;
   providing a forward barrier positioned opposite the rearward opening and connected to the vehicle to limit forward motion of the wheeled mobility device, the forward barrier including at least one energy absorbing member, the forward barrier being positioned to be in contact with at least one of the wheeled mobility device or the occupant when the wheeled mobility device is contained by the system to prevent excessive forward movement of the wheeled mobility device via abutment with at least one of the wheeled mobility device or the occupant upon forward movement of the wheeled mobility device, the forward barrier comprising a generally central opening therein adapted to seat a tiller of the scooter-type wheeled mobility device, the energy absorbing member absorbing energy upon abutment of at least one of the wheeled mobility device or the occupant upon forward movement of the wheeled mobility device, and
   providing at least a first lateral barrier to limit lateral motion of the wheeled mobility device to a first side, the first lateral barrier being positioned to be in close proximity to the wheeled mobility device when the wheeled mobility device is contained by the system to prevent excessive lateral movement of the wheeled mobility device in the direction of the first lateral barrier.

* * * * *